Figure 2:
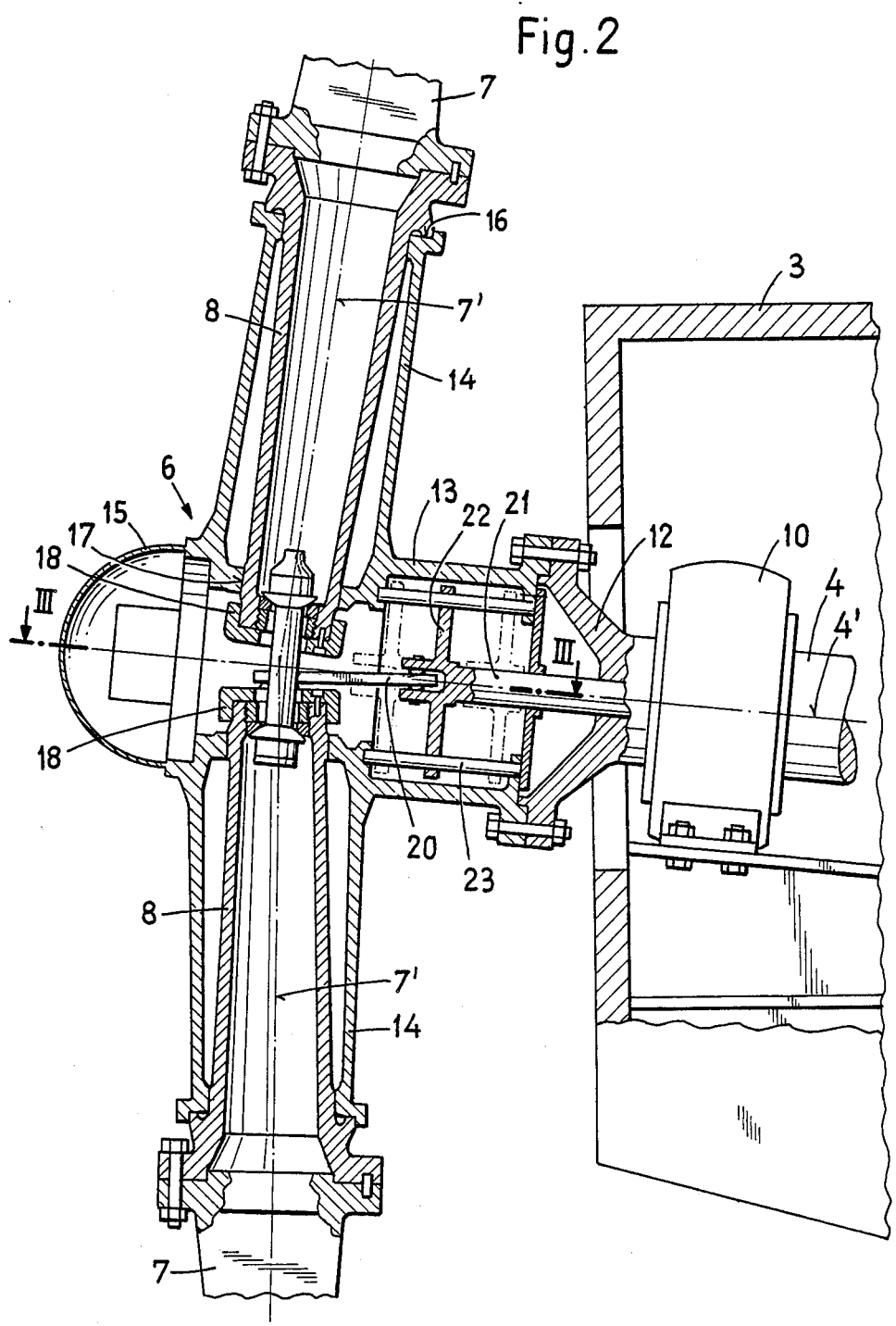

United States Patent [19]

Kiss

[11] Patent Number: 4,773,824
[45] Date of Patent: Sep. 27, 1988

[54] ROTOR OF A WIND POWER INSTALLATION

[75] Inventor: Stefan Kiss, Waldburg, Fed. Rep. of Germany

[73] Assignee: Sulzer-Escher Wyss GmbH (PLLC), Ravensburg, Fed. Rep. of Germany

[21] Appl. No.: 925,798
[22] PCT Filed: Dec. 21, 1985
[86] PCT No.: PCT/EP85/00736
   § 371 Date: Oct. 20, 1986
   § 102(e) Date: Oct. 20, 1986
[87] PCT Pub. No.: WO86/04392
   PCT Pub. Date: Jul. 31, 1986

[30] Foreign Application Priority Data

Jan. 18, 1985 [CH] Switzerland ............ 00223/85

[51] Int. Cl.⁴ .................................. F03D 1/06
[52] U.S. Cl. ....................... 416/168 A; 416/10; 416/212 A; 416/225; 416/136; 416/205
[58] Field of Search ............ 416/205, 204, 168 R, 416/168 A, 141 R, 10-11, 225, 212 R, 136 R, 136 A, 138 R, 138 A

[56] References Cited

U.S. PATENT DOCUMENTS

| | | | |
|---|---|---|---|
| 2,146,367 | 2/1939 | Berliner | 416/168 X |
| 2,809,506 | 10/1957 | McDaniel | 416/135 B X |
| 3,470,962 | 10/1969 | Cure | 416/141 X |
| 3,640,643 | 2/1972 | Monti | 416/136 |
| 3,695,780 | 10/1972 | Velkoff | 416/205 X |
| 4,029,434 | 6/1977 | Kenney | 416/225 |
| 4,186,975 | 2/1980 | Schwarz et al. | 416/134 A X |
| 4,307,996 | 12/1981 | Watson | 416/138 A X |
| 4,534,705 | 8/1985 | Selestam et al. | 416/11 |

FOREIGN PATENT DOCUMENTS

| | | | |
|---|---|---|---|
| 528150 | 7/1956 | Canada | 416/212 |
| 2806874 | 8/1979 | Fed. Rep. of Germany | 416/11 |
| 2825061 | 12/1979 | Fed. Rep. of Germany | 416/11 |
| 470654 | 9/1975 | U.S.S.R. | 416/205 |
| 449664 | 7/1936 | United Kingdom | 416/136 |
| 751109 | 6/1958 | United Kingdom | 416/102 |

Primary Examiner—Everette A. Powell, Jr.
Attorney, Agent, or Firm—Kenyon & Kenyon

[57] ABSTRACT

The journals of two vanes of the wind turbine are connected with one another by a connecting rod 26 for absorption of the centrifugal forces of the vanes. Bearings with spherical faces are arranged between the ends of the connecting rod and the journals. The connecting rod is prestressed with a tensile force by means of a tubular bushing which surrounds the rod and which cooperates with threaded rings on the rod to tension the rod.

8 Claims, 3 Drawing Sheets

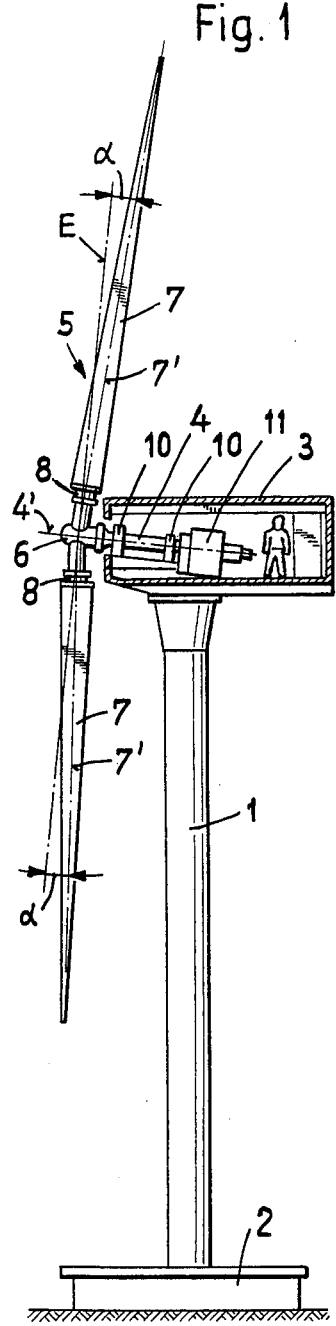
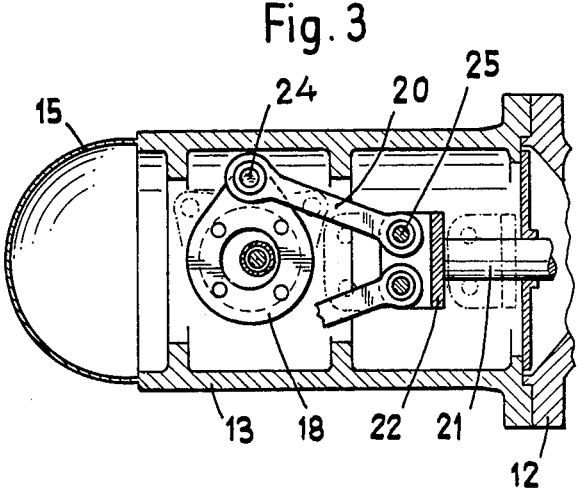

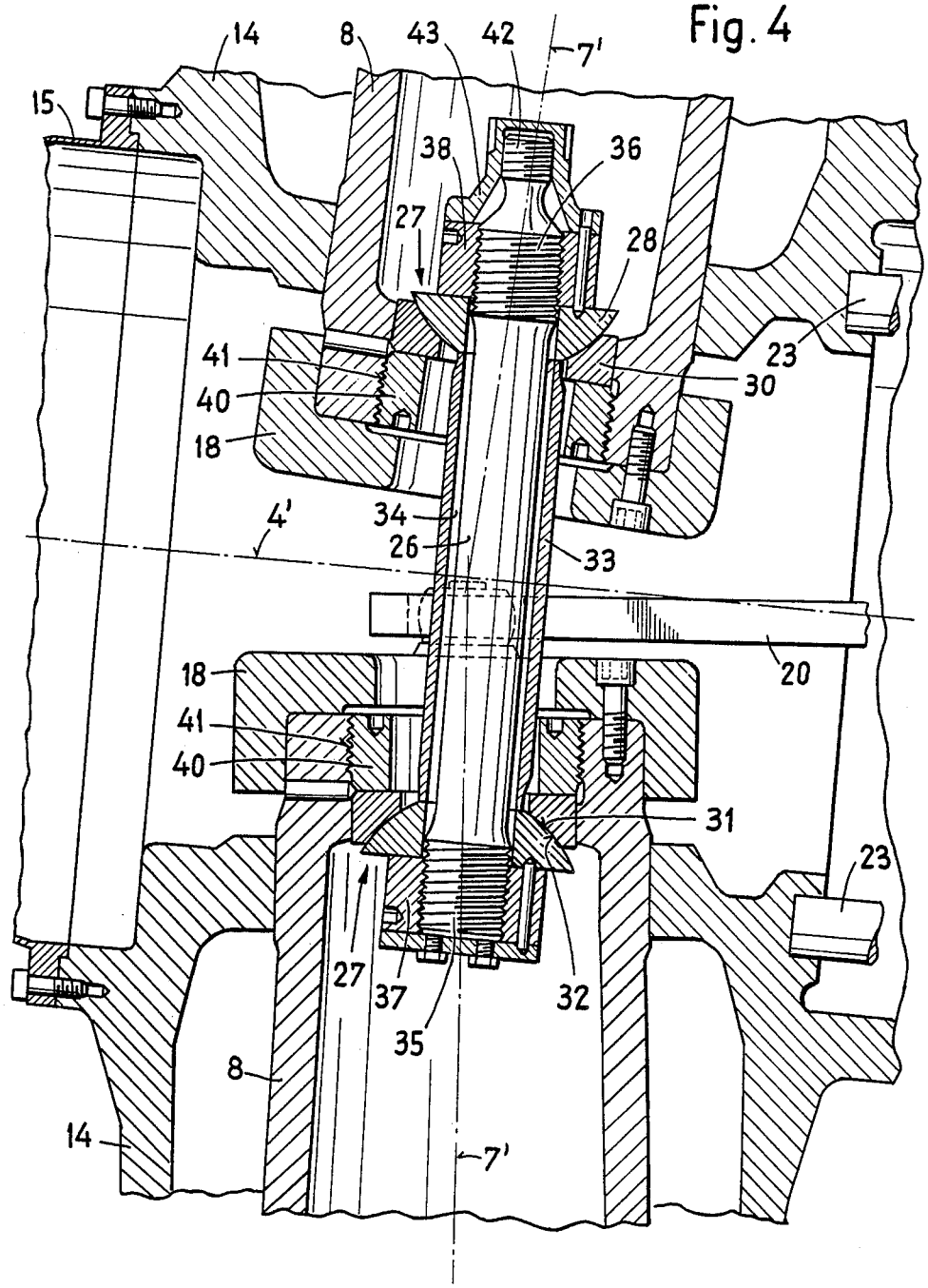

ROTOR OF A WIND POWER INSTALLATION

The invention relates to a rotor of a wind power installation. More particularly, this invention relates to the mounting of vanes on a rotor of a wind power installation.

Heretofore, various wind power installations have been known which employ rotors for generating power from the wind. Generally, the rotors have been provided with vanes which are disposed to rotate about a common axis of rotation. For example, it has been known to provide a rotor with a pair of vanes which are offset by 180° from each other and which have axes inclined relative to a plane perpendicular to the axis of rotation of the rotor by an acute angle.

In such rotors, the vanes are exposed in operation to strong centrifugal forces, which are absorbed by the hub. The hub, therefore, must be of correspondingly heavy construction. As a result, the hub is large, heavy, expensive and fluidically unfavorable as to wind flow.

The invention has as its objects the creation of a rotor of this kind whose hub is relieved of these centrifugal forces and therefore can be built smaller, lighter, and at lower cost.

It is another object of the invention to reduce the size of rotors for converting wind energy.

It is another object of the invention to increase the lift of a rotor for a wind power installation.

Briefly, the invention provides a rotor for a wind power installation which comprises a hub for rotation about an axis of rotation, at least one pair of vanes disposed about the hub with each vane having an axis of rotation inclined relative to a plane perpendicular to the axis of rotation of the hub and a pair of journals each of which rotatably connects the vane to the hub to permit rotation of the each vane about the respective vane axis.

In accordance with the invention, the journals of both vanes are connected with one another by a connecting rod perpendicular to the axis of rotation of the hub. In this respect, the connecting rod is secured between and to the journals in order to absorb centrifugal forces of the vanes during use. In addition, a spherical bearing is disposed between each journal and a respective end of the connecting rod in order to permit rotation of each vane relative to the connecting rod.

During operation, the centrifugal forces of the two vanes are mutually balanced out by the connecting rod. Hence, the hub need absorb only the weight of the vanes and the force components of the wind power.

Preferably the connecting rod may be surrounded by a tubular bushing, by means of which the rod is pre-stressed by a tensile force. Thereby the long-term strength of the connecting rod, which in operation, under the influence of gravity, is exposed to a pulsating load, is substantially increased.

Further, the space between the connecting rod and the bushing may preferably be provided with lubricating grease to protect against corrosion of the surface of the connecting rod, which would result in a reduction of the long-term strength.

An especially favorable embodiment is obtained by providing the connecting rod at its ends with threads on which threaded rings are screwed to be supported via the inner rings of the bearings on the ends of the bushing.

The outer rings, cooperating with the inner rings of the bearings can then preferably be supported on threaded rings which are screwed into threaded bores formed in the journals.

The bearings may be cup bearings with spherical sliding faces of the bearing rings. It is understood, however, that corresponding antifriction bearings, so-called swivel-joint roller bearings, which permit an inclination of the axes, may be used in their place.

The invention will be explained with reference to a preferred embodiment illustrated schematically in the drawing.

FIG. 1 shows an overall view of a wind power installation with the rotor according to the invention;

FIG. 2, a detail from FIG. 1 with partial section, on a larger scale;

FIG. 3, section III—III from FIG. 2, and

FIG. 4, a section of a part of the hub from FIG. 2, enlarged again.

The wind power installation illustrated in FIG. 1 contains a mast 1 which is secured in a base 2 and carries a cabin 3 in which a shaft 4 of a rotor 5 is rotatably mounted. The cabin 3 in turn is rotatably mounted at the upper end of the mast 1, in such a way that the cabin 3 can be adjusted with respect to the wind direction.

Rotor 5 contains a hub 6, which is secured on the shaft 4 and in which two vanes 7 are mounted for rotational adjustment by means of journals 8. The vanes 7 are offset by 180° in the direction of rotation of the rotor, that is, the axes of both lie in a plane passing through the axis of rotation 4'. At the same time the axes 7' of the vanes 7 are inclined relative to a plane E perpendicular to the axis of rotation 4' of the rotor under an acute angle alpha of e.g. 4° in the sense of a sweepback directed against the wind direction.

Shaft 4, whose axis 4' forms the axis of rotation of rotor 5, is mounted in the cabin 3 in bearing blocks 10 and leads to a transmission 11, from which a shaft (not shown) leads to an electric generator (not shown), which may be disposed e.g. in the base 2.

FIG. 2 shows hub 6 together with the end of the cabin 3 which is closer to rotor 5, on a larger scale and in section.

Hub 6 contains a cylindrical hollow central hub portion 13 which is secured to a flange 12 of shaft 4 and from which hollow tubular arms 14 extend essentially in the direction of the axes 7' of the vanes 7. The hub portion 13 is closed off by a cupola 15. In the arms 14, the journals 8 are mounted by means of bearing surfaces 16, 17.

At the inner ends of the journals 8, sleeves 18 are fastened, which are provided with gudgeons not visible in FIG. 2 but shown in FIGS. 3 and 4, at which engage rods 20, which lead (away) from an adjusting rod 21. The adjusting rod is guided by means of a yoke plate 22 and guide rods 23, which at the same time prevent rotational displacement of the adjusting rod 21 relative to hub 6. The mounting of the rods 20 is spherical bearings of the gudgeons 24 at the sleeves 18 and gudgeons 25 of the yoke plate 22 is shown in FIG. 3.

It is seen therefrom that by a movement of the adjusting rod 21 toward or away from hub 6 the vanes 7 can be rotated, whereby their angle of attack relative to the wind direction can be adjusted or changed in the desired manner.

FIG. 4 shows the central portion of hub 6 still further enlarged. As can be seen from this figure, the ends of the journals 8—toward the axes of rotation 4' of rotor 5—of the vanes 7 are connected with one another by a connecting rod 26 which is perpendicular to the axis of rotation 4' of rotor 5. Between the ends of connecting rod 26 and the journals 8, bearings 27 are arranged, each having an inner ring 28 and an outer ring 30, which are provided with the sperical faces 31 and 32.

As can further be seen from FIG. 4, the connecting rod 26 is surrounded by a tubular bushing 33, by means of which it is prestressed by a tensile stress. The space 34 between the connecting rod 26 and the bushing 33 is filled with a lubricating grease protecting against corrosion.

To create the prestress force, the connecting rod 26 is provided at its ends with threads 35, 36 on which threaded rings 37, 38 are screwed, and which are supported by the inner rings 28 of the bearings 27 on the ends of the bushing 33.

The outer rings 30 cooperating with the inner rings 28 of the bearings 27 faces are supported on threaded rings 40, which are screwed into threaded bores 41 formed in the journals 8.

To create the tensile force by which the connecting rod 26 is prestressed, the latter is provided at one end with a threaded journal 42, at which a tensioning device (not shown), e.g. a hydraulic one, can be inserted, which braces itself agains the inner bearing ring 28. After the creation of the prestress force, the threaded ring 38 can be tightened and secured. After removal of the tensioning device, the threaded journal 42 can be protected by a cap nut 43.

As has been mentioned, the cup bearing 27 with the sliding faces 31 and 32 may be replaced by a so-called swivel-joint roller bearing having barrel-shaped rolling bodies which roll off on a spherical surface.

I claim:

1. A rotor for a wind power installation comprising
a hub for rotation about an axis of rotation;
at least one pair of vanes disposed about said hub, each said vane having an axis inclined relative to a plane perpendicular to said axis of rotation;
a pair of journals, each said journal rotatably connecting a respective vane to said hub to rotate about said respective van axis;
a connecting rod perpendicular to said axis of rotation and secured between and to said journals to absorb centrifugal forces thereof;
a tubular bushing surrounding said rod and holding said rod under a prestressed tension force; and
a pair of spherical bearings, each said bearing being disposed between a respective journal and a respective end of said connecting rod to permit rotation of said vanes relative to said connecting rod.

2. A rotor as set forth in claim 1 which further comprises lubricating grease between said rod and said bushing.

3. A rotor as set forth in claim 1 wherein each spherical bearing has an inner ring with a spherical surface engaging one end of said bushing and which further comprises a pair of rings, each ring being threaded on a respective threaded end of said rod against a respective inner ring for prestressing of said rod.

4. A rotor as set forth in claim 3 wherein each spherical bearing has an outer ring slidably receiving a respective inner ring and which further comprises a pair of threaded rings, each said threaded ring being threaded into a respective journal.

5. A rotor as set forth in claim 1 wherein each bearing is a cup bearing having a pair of rings with opposed spherical sliding surfaces.

6. A rotor for a wind power installation comprising
a hub for rotation about an axis of rotation;
at least one pair of vanes disposed about said hub, each said vane having an axis passing through said axis of rotation;
a pair of journals, each said journal being connected to a respective vane and rotatably mounted in said hub to rotate about said respective van axis;
a connecting rod perpendicular to said axis of rotation and secured between and to said journals to absorb centrifugal forces thereof;
a tubular bushing surrounding said rod and holding said rod under a prestressed tension force; and
a pair of spherical bearings, each said bearing being disposed between a respective journal and a respective end of said connecting rod to permit rotation of said vanes relative to said connecting rod.

7. A rotor as set forth in claim 6 wherein each spherical bearing has an inner ring with a spherical surface engaging one end of şaid bushing and which further comprises a pair of rings, each ring being threaded on a respective threaded end of said rod against a respective inner ring for prestressing of said rod.

8. A rotor as set forth in claim 7 wherein each spherical bearing has an outer ring slidably receiving a respective inner ring and which further comprises a pair of threaded rings, each said threaded ring being threaded into a respective journal.

* * * * *

UNITED STATES PATENT AND TRADEMARK OFFICE
CERTIFICATE OF CORRECTION

PATENT NO. : 4,773,824

DATED : September 27, 1988

INVENTOR(S) : Stefan Kiss

It is certified that error appears in the above-identified patent and that said Letters Patent is hereby corrected as shown below:

```
Column 1, line 29 "lift" should be -life-
Column 2, line 55 "rod" should be -rod 21-
Column 2, line 58 "is" should be -in-
Column 3, line 20 "27 faces are" should be -27 are-
Column 4, line 29 "van" should be -vane-
```

Signed and Sealed this

Fourteenth Day of March, 1989

*Attest:*

DONALD J. QUIGG

*Attesting Officer*   *Commissioner of Patents and Trademarks*